United States Patent
Kwon et al.

(10) Patent No.: US 9,947,949 B2
(45) Date of Patent: Apr. 17, 2018

(54) METHOD FOR CONTROLLING POWER THRESHOLD VALUE OF FUEL CELL

(71) Applicants: Hyundai Motor Company, Seoul (KR); Kia Motors Corporation, Seoul (KR)

(72) Inventors: Sang Uk Kwon, Gyeonggi-do (KR); Sung Gone Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 306 days.

(21) Appl. No.: 14/710,973

(22) Filed: May 13, 2015

(65) Prior Publication Data

US 2016/0172695 A1   Jun. 16, 2016

(30) Foreign Application Priority Data

Dec. 15, 2014   (KR) .......................... 10-2014-0180190

(51) Int. Cl.
| | |
|---|---|
| *H01M 8/04* | (2016.01) |
| *H01M 8/0432* | (2016.01) |
| *H01M 8/04828* | (2016.01) |
| *H01M 8/04302* | (2016.01) |

(52) U.S. Cl.
CPC ....... *H01M 8/0432* (2013.01); *H01M 8/0494* (2013.01); *H01M 8/04302* (2016.02); *H01M 2250/20* (2013.01); *Y02T 90/32* (2013.01)

(58) Field of Classification Search
CPC .......... H01M 8/0432; H01M 8/04302; H01M 8/0494; H01M 2250/20; Y02T 90/32
USPC ....................................................... 429/442
See application file for complete search history.

(56) References Cited

U.S. PATENT DOCUMENTS

2013/0323540 A1\* 12/2013 Matsusue .......... H01M 8/04507
429/9

FOREIGN PATENT DOCUMENTS

| JP | 2010-049827 A | 3/2010 |
|---|---|---|
| JP | 2013-171682 A | 9/2013 |

\* cited by examiner

*Primary Examiner* — Gary Harris
(74) *Attorney, Agent, or Firm* — Mintz Levin Cohn Ferris Glovsky and Popeo, P.C.; Peter F. Corless

(57) ABSTRACT

A system and method for controlling power of a fuel cell for a vehicle are provided. The method includes measuring a temperature of the fuel cell and when the measured temperature of the fuel cell is within a high temperature range in which a power threshold value of the fuel cell is reduced based on an increase in temperature of the fuel cell and when the measured temperature of the fuel cell is increased and then is equal to or greater than a predetermined temperature a power threshold value is reduced from a power value at the predetermined temperature. The high temperature range is a range between a third temperature at which the power threshold value starts to be reduced based on the increase in temperature of the fuel cell and a fourth temperature at which the power threshold value is reduced and then reaches the minimum power threshold value.

17 Claims, 10 Drawing Sheets

RE;ATED ART

METHOD FOR CONTROLLING POWER THRESHOLD VALUE OF FUEL CELL

CROSS REFERENCE TO RELATED APPLICATION

The present application claims priority of Korean Patent Application Number 10-2014-0180190 filed on Dec. 15, 2014, the entire contents of which application are incorporated herein for all purposes by this reference.

BACKGROUND

1. Technical Field

The present invention relates to a system and method for controlling power of a fuel cell to prevent deterioration and performance degradation of the fuel cell, and more particularly, to a system and method for controlling power of a fuel cell to prevent the power from being suddenly changed.

2. Description of the Related Art

To prevent performance deterioration of a fuel cell stack, a high temperature operation region should be avoided. However, even though temperature is maintained in an appropriate range by a cooling control of a fuel cell, the fuel cell may increase to the high temperature operation region due to a limitation of cooling performance. In particular, a method for limiting power may not be able to be used. The present invention proposes a method for optimally limiting power for minimizing a damage of operation characteristics and optimally maintaining performance of the stack, in the method for limiting power at high temperature. In addition to power limit mapping for an operation temperature, prevention of power limit shaking, maintenance of power limit start reference consistency, change in a power limiting reference based on an environment and operation state, and the like will be used.

A fuel cell system is configured to include a hydrogen supply system, an air supply system, and a cooling system and includes a separate fuel cell load apparatus. The cooling system is configured to include a water pump for supplying cooling water, a radiator and a radiator fan for heat radiation of cooling water, and a thermostat for adjusting an amount of water of a radiator loop and a bypass loop. The fuel cell load apparatus is used to prevent a stack voltage from increasing during warm-up of a fuel cell or starting/shut down. The fuel cell load apparatus may be a resistor, a chargeable high voltage battery, or other load apparatuses.

To adjust the temperature of the fuel cell, the radiator fan and the water pump are operated to prevent the stack from increasing to a high temperature (e.g., predetermined temperature) and the warm-up control is performed using the fuel cell load apparatus to prevent the stack from decreasing to particular low temperature. Accordingly, even though a control for preventing the high temperature/low temperature operation is performed, the temperature may not be maintained in acceptable range due to the limitation of cooling and warm-up performance. Consequently, power to temperature is limited and thus, the deterioration (e.g., flooding prevention during low temperature, prevention of high temperature dry-out, prevention of high temperature deterioration, and the like) of the stack is prevented. However, when adjusting the power of the stack based on temperature, the power may be transient, drivability may be reduced, and the deterioration of the fuel cell may not effectively be prevented in advance.

The matters described as the related art have been provided merely for assisting in the understanding for the background of the present invention and should not be considered as corresponding to the related art known to those skilled in the art.

SUMMARY

An object of the present invention is to provide a system and method for controlling power of a fuel cell to prevent deterioration and performance degradation of the fuel cell, and more particularly, to a system and method for controlling power of a fuel cell to prevent the power from being suddenly changed.

According to an exemplary embodiment of the present invention, a method for controlling power of a fuel cell may include: measuring a temperature of the fuel cell; and when the measured temperature of the fuel cell is within a predetermined high temperature range in which a power threshold value of the fuel cell is reduced based on an increase in temperature of the fuel cell and when the measured temperature of the fuel cell is increased and then is equal to or greater than a predetermined temperature, reducing a power threshold value from a power value at the predetermined temperature. The predetermined high temperature range may be a range between a third temperature at which the power threshold value starts to be reduced based on the increase in temperature of the fuel cell and a fourth temperature at which the power threshold value is reduced and then reaches the minimum power threshold value.

The reducing of the power threshold value may further include reducing the power threshold value of the fuel cell between a maximum power threshold value based on the increase in the measured temperature of the fuel cell and a power value of a fifth temperature, when the measured temperature of the fuel cell ranges from the fifth temperature which is preset to be greater than the third temperature but less than the fourth temperature. The reducing of the power threshold value may further include reducing the power threshold value of the fuel cell between the power value at the fifth temperature and the minimum power threshold value, when the measured temperature of the fuel cell is greater than the fifth temperature which is preset to be greater than the third temperature but less than the fourth temperature.

The method may further include: fixing the power threshold value of the fuel cell to a minimum value when the measured temperature of the fuel cell is greater than the high temperature range. In addition, the method may include: increasing the power threshold value of the fuel cell based on the increase in temperature of the fuel cell when the measured temperature of the fuel cell is within a predetermined low temperature range. The low temperature range may be a range between a first temperature at which the power threshold value of the fuel cell is maintained substantially constant and then starts to increase and a second temperature at which the power threshold value is increased and then reaches the maximum power threshold value. The method may further include: fixing the power threshold value of the fuel cell to a first output threshold value greater than a minimum output threshold value within the high temperature range when the measured temperature of the fuel cell is less than the low temperature range.

The first output threshold value may be adjusted upward (e.g., adjusted to increase) when the measured temperature of the fuel cell is maintained to be equal to or greater than a reference value for a reference time. The method may further include: adjusting the power threshold value of the fuel cell to be maintained substantially constant when the measured temperature is within a preset limit temperature range even though the measured temperature of the fuel cell is within the high temperature range.

The adjusting may include increasing the power threshold value when the power threshold value of the fuel cell is maintained substantially constant during the reduction in the measured temperature of the fuel cell and then deviates from the limit temperature range when the measured temperature of the fuel cell is within the high temperature range and is within the preset limit temperature range and reducing the power threshold value of the fuel cell when the power threshold value of the fuel cell is maintained substantially constant and then deviates from the limit temperature range when the measured temperature of the fuel cell is increased.

Additionally, the method may further include: adjusting the power threshold value of the fuel cell to be maintained substantially constant when the measured temperature is within a preset limit temperature range even though the measured temperature of the fuel cell is within the low temperature range. The adjusting may include increasing the power threshold value when the power threshold value of the fuel cell is maintained substantially constant during the increase in the measured temperature of the fuel cell and then deviates from the limit temperature range when the measured temperature of the fuel cell is within the low temperature range and is within the preset limit temperature range and reducing the power threshold value when the power threshold value of the fuel cell is maintained substantially constant and then deviates from the limit temperature range when the measured temperature of the fuel cell is reduced.

The high temperature range may change based on outdoor temperature and a climbing angle (e.g., a road inclination of a road in which a vehicle is running forward) or an operation speed of the fuel cell for a vehicle. The third temperature or the fifth temperature which is preset to be greater than the third temperature but less than the fourth temperature may be adjusted downward (e.g., adjusted to be decreased) when the vehicle speed is reduced or the outdoor temperature increases or as the climbing angle is increased. The third temperature or the fifth temperature which is preset to be greater than the third temperature but less than the fourth temperature may be adjusted downward when the measured temperature of the fuel cell is maintained at the third temperature or greater for a predetermined time and when the vehicle speed is reduced or the outdoor temperature increases or as the climbing angle is increased. The low temperature range may change based on whether the fuel cell stack is warmed-up prior to being driven When the time period during which the measured temperature of the fuel cell is maintained to be equal to or greater than the second temperature exceeds a predetermined time, the first temperature or the second temperature may be adjusted downward or a first power threshold value greater than a minimum power threshold value within the high temperature range may be adjusted upward. A targeted operation temperature which is a reference temperature adjusting revolutions per minutes (RPM) of a cooling water pump, RPM of a radiator fan, or an opening of a thermostat may be changed based on a change in the high temperature range.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
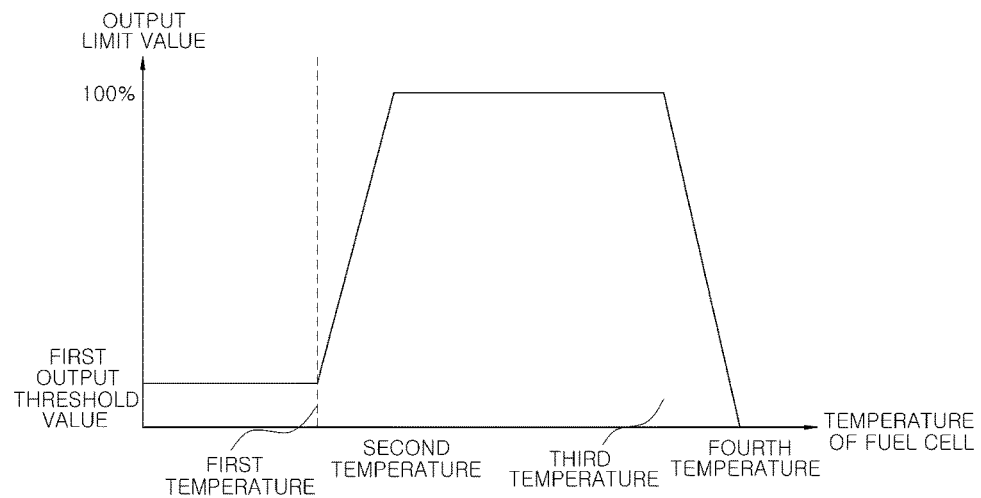
FIG. 1 is an exemplary graph for describing a method for controlling power of a fuel cell according to Comparative Example of the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described with reference to the accompanying drawings.

Figure 2:
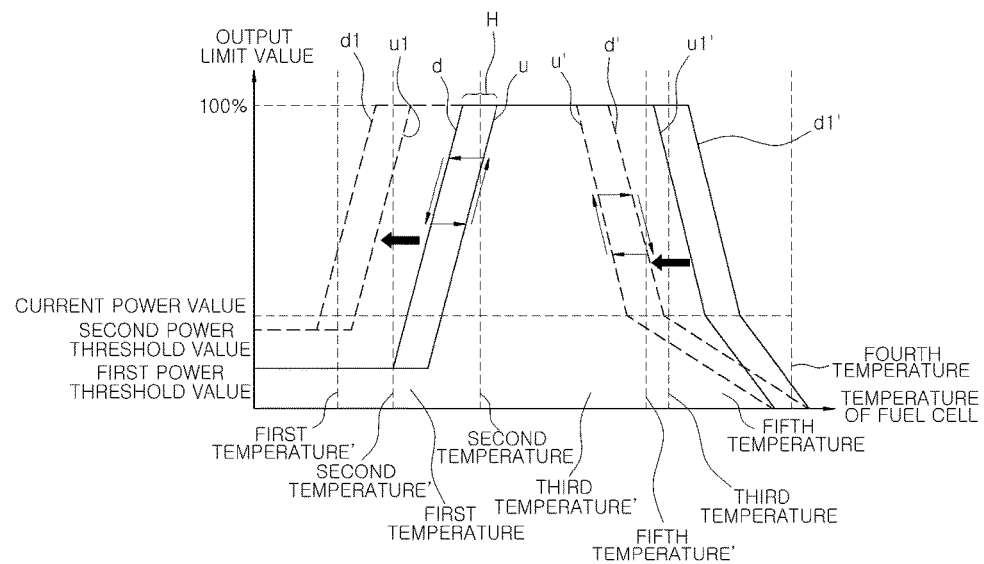
FIG. 2 is an exemplary graph for describing a method for controlling power of a fuel cell according to an exemplary embodiment of the present invention.
Figure 3:
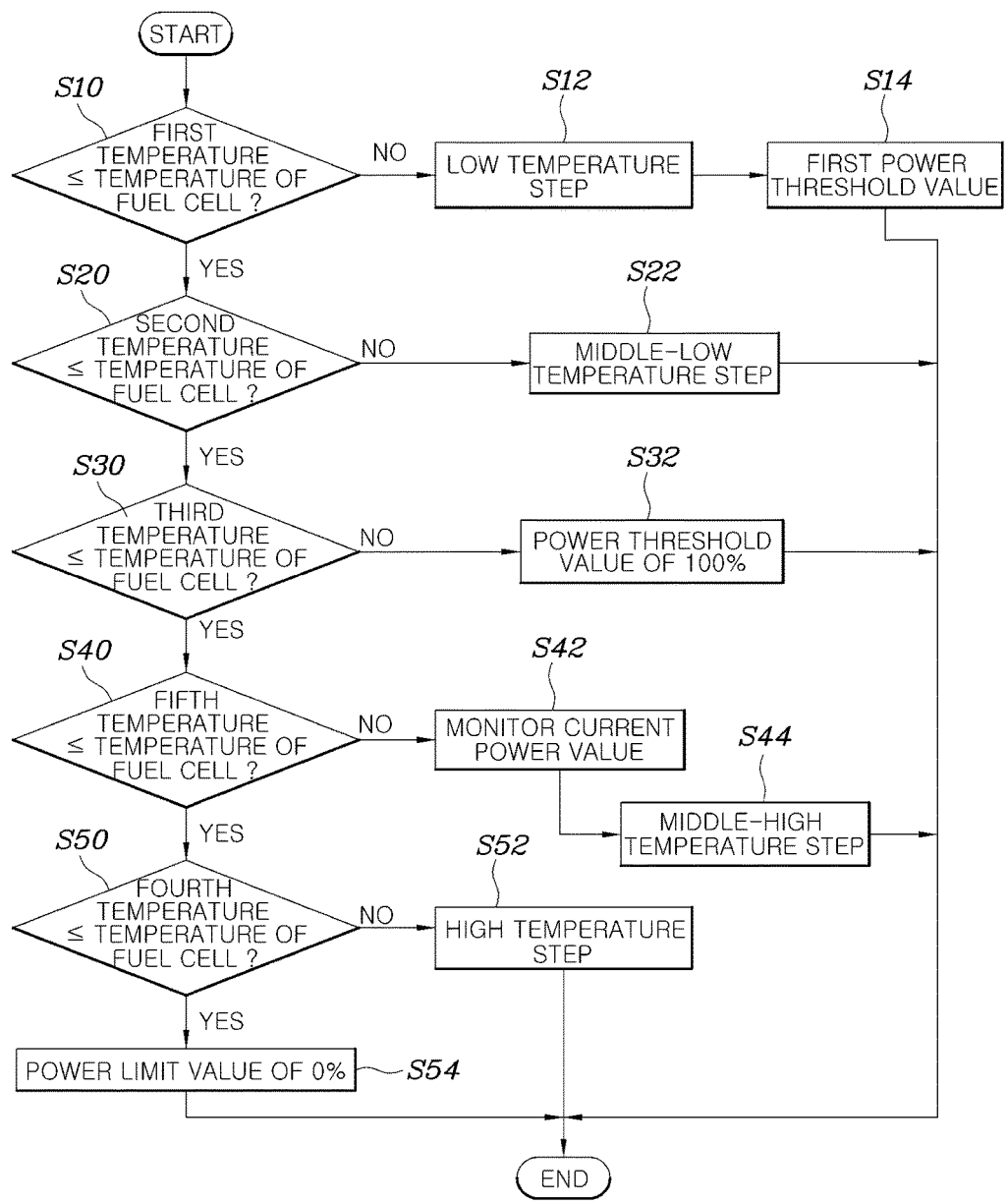
FIGS. 3 and 4 are exemplar flow charts of the method for controlling power of a fuel cell according to the exemplary embodiment of the present invention.
Figure 4:
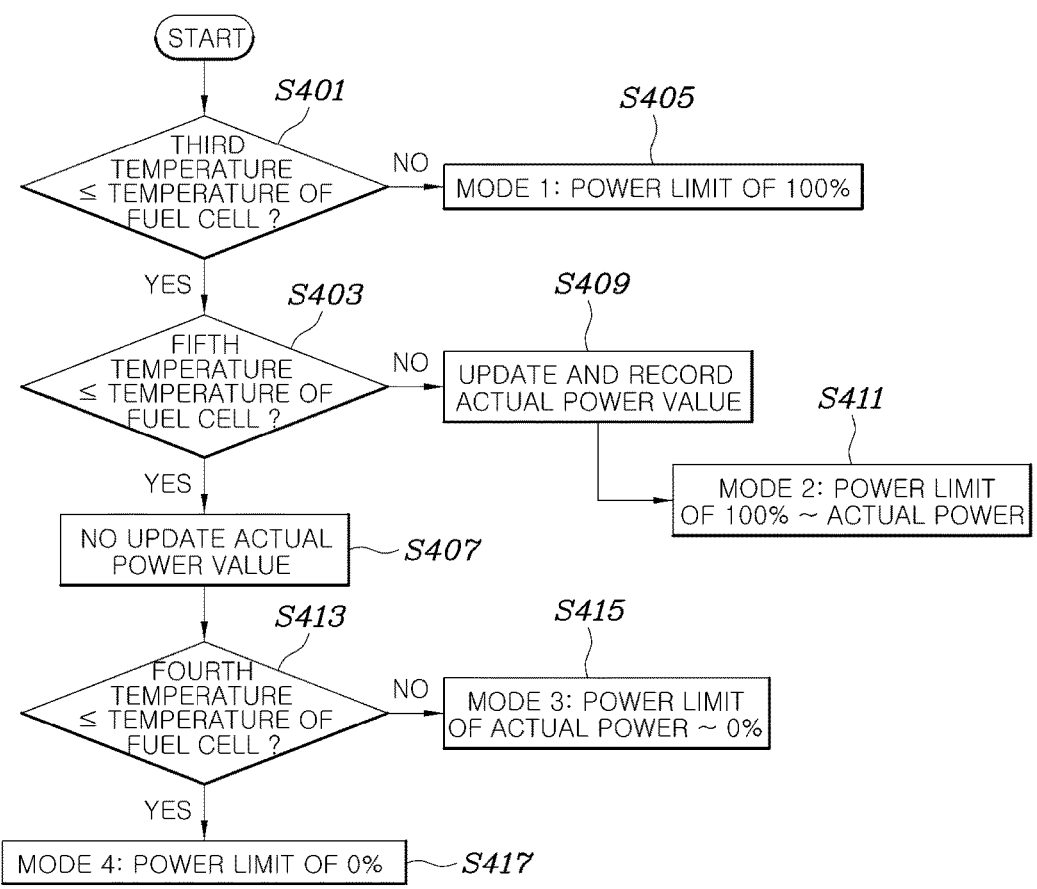
Figure 5:
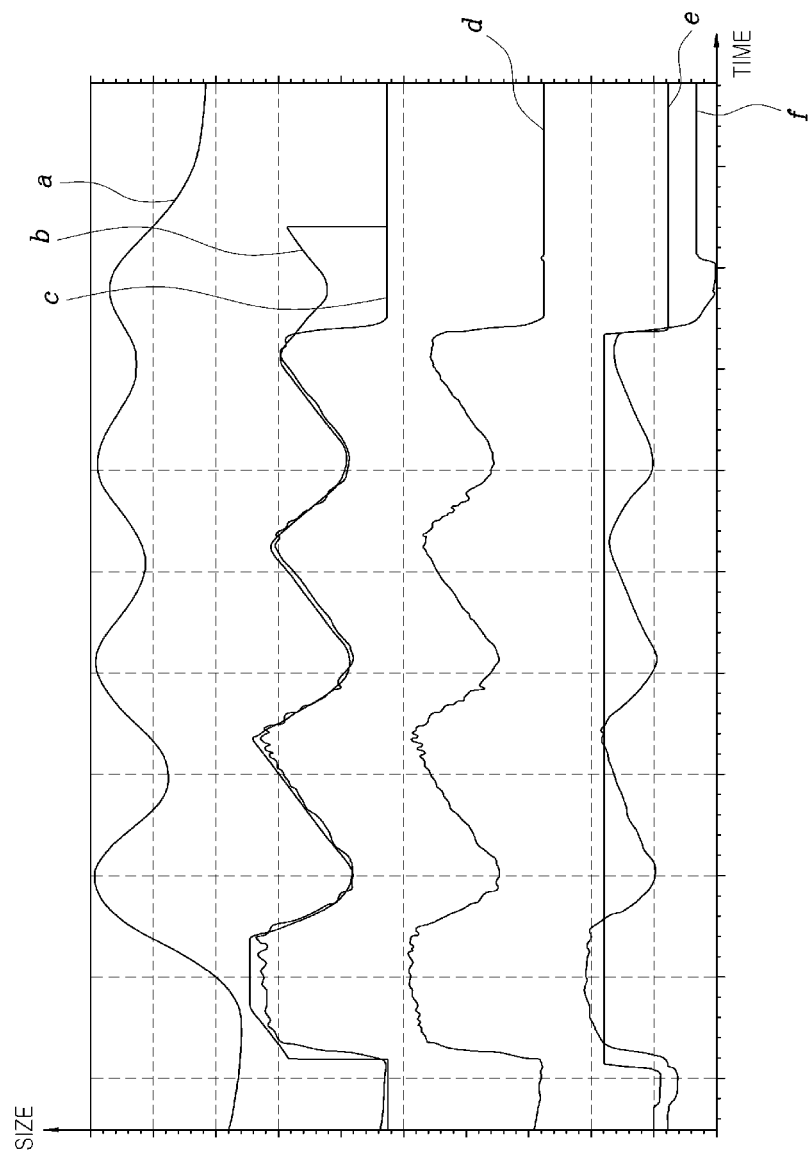
FIG. 5 is an exemplary graph for a use result of the method for controlling power of a fuel cell according to Comparative Example of the related art.
Figure 6:
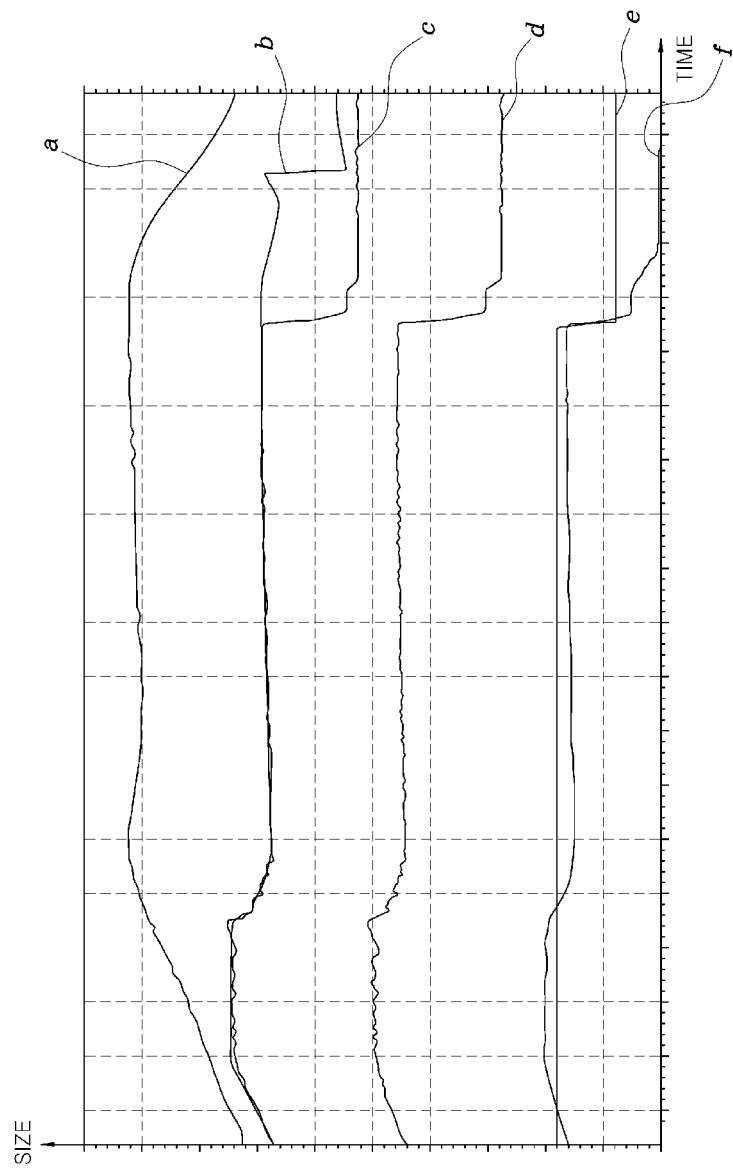
FIG. 6 is an exemplary graph for a use result of the method for controlling power of a fuel cell according to the exemplary embodiment of the present invention.
Figure 7:
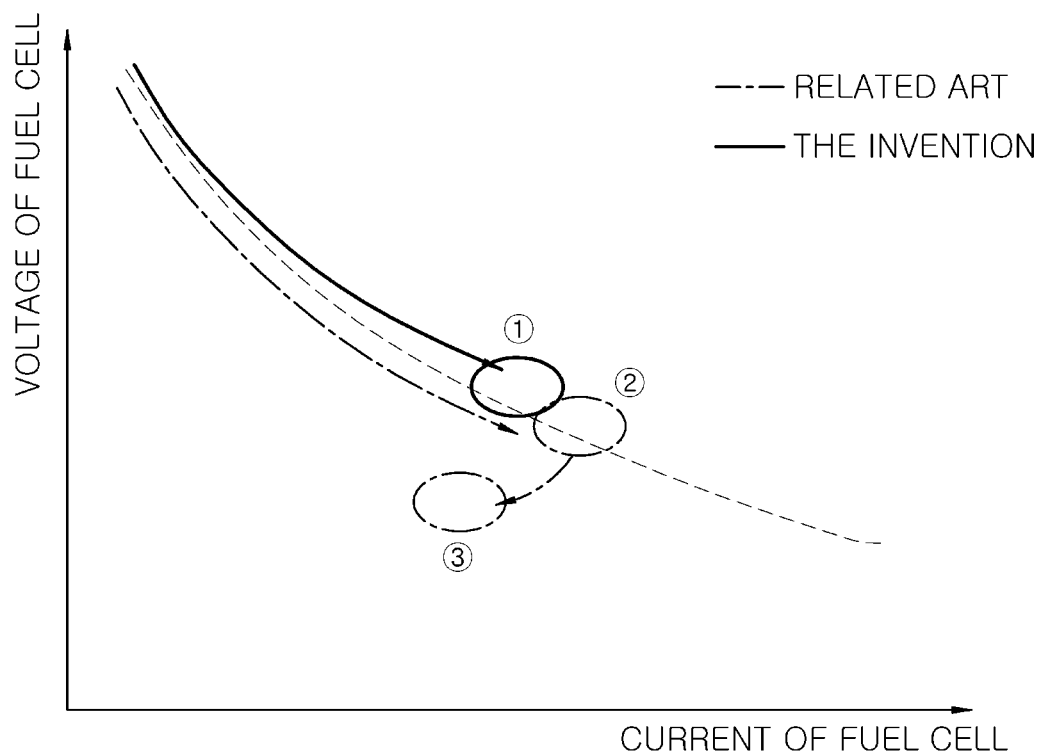
FIGS. 7 and 8 are exemplary graphs for a comparison result of the method for controlling power of a fuel cell according to the exemplary embodiment of the present invention and Comparative Example.
Figure 8:
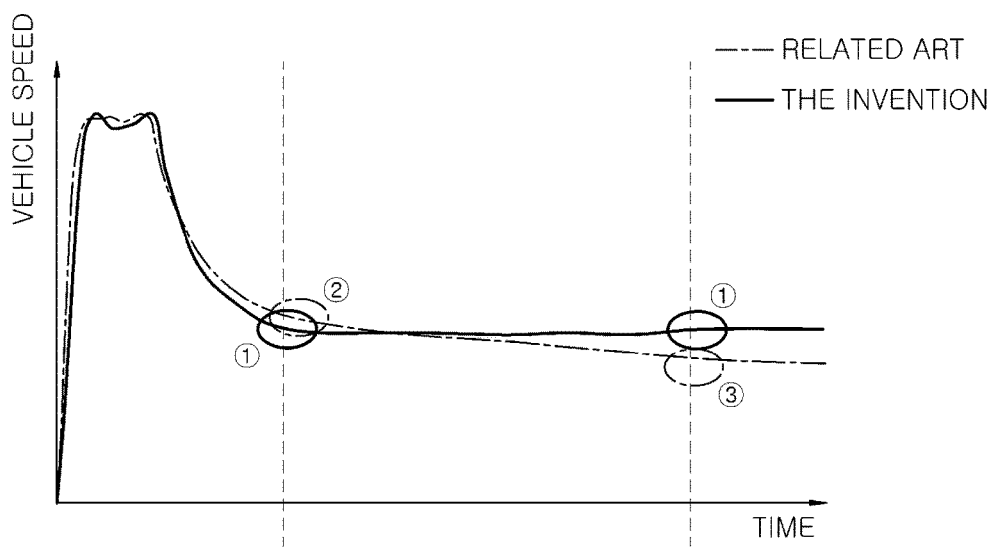
Figure 9:
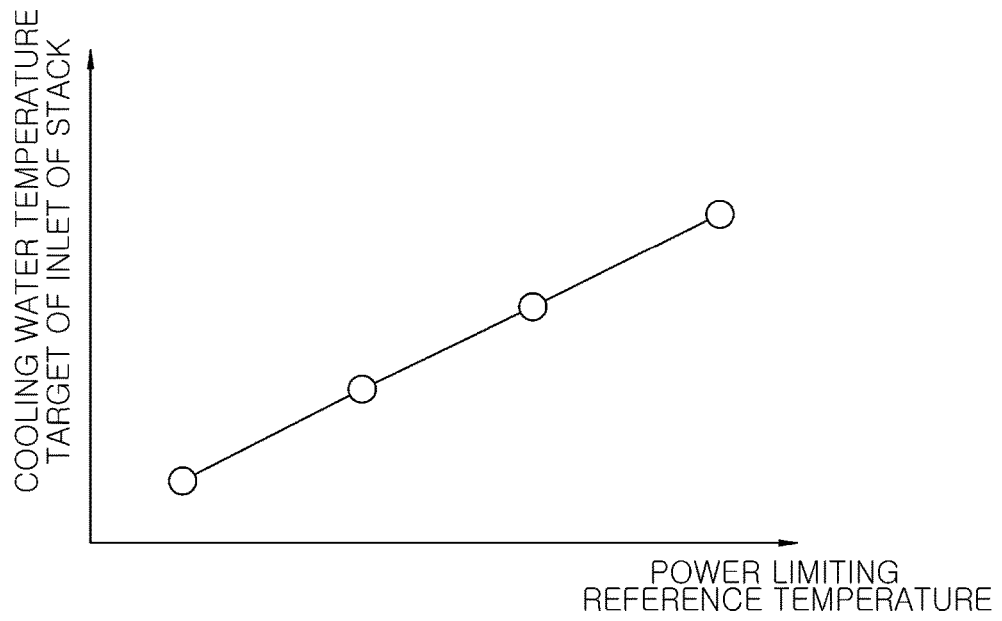
FIG. 9 is an exemplary diagram describing a cooling control associated with a power control according to the exemplary embodiment of the present invention.
Figure 10A:
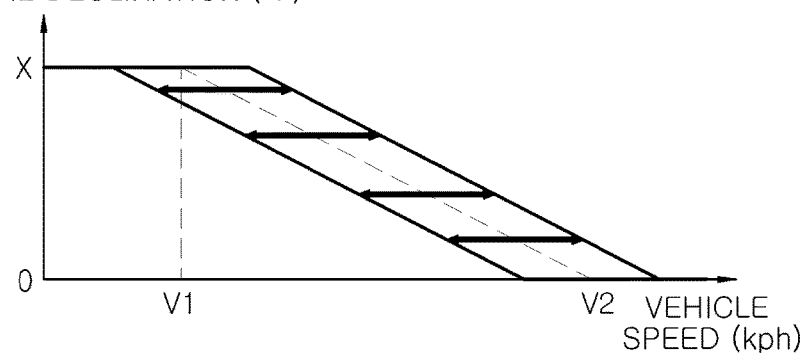
FIGS. 10A and 10B are exemplary graphs illustrating current limiting reference temperature declination depending on a vehicle speed and outdoor temperature in the method for controlling power according to the exemplary embodiment of the present invention.
Figure 10B:
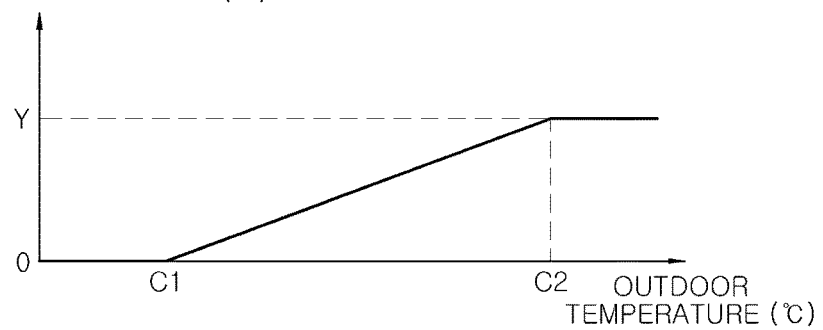
Figure 11:
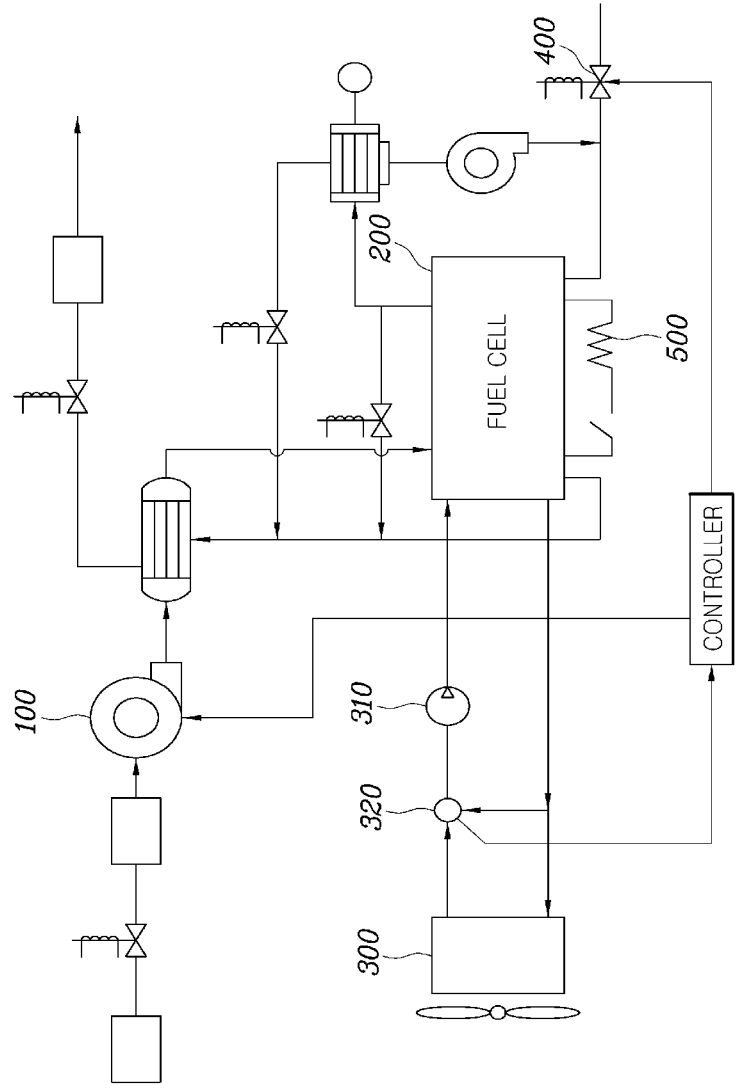
FIG. 11 is an exemplary diagram illustrating a fuel cell system of a vehicle according to the related art.
Figure 12:
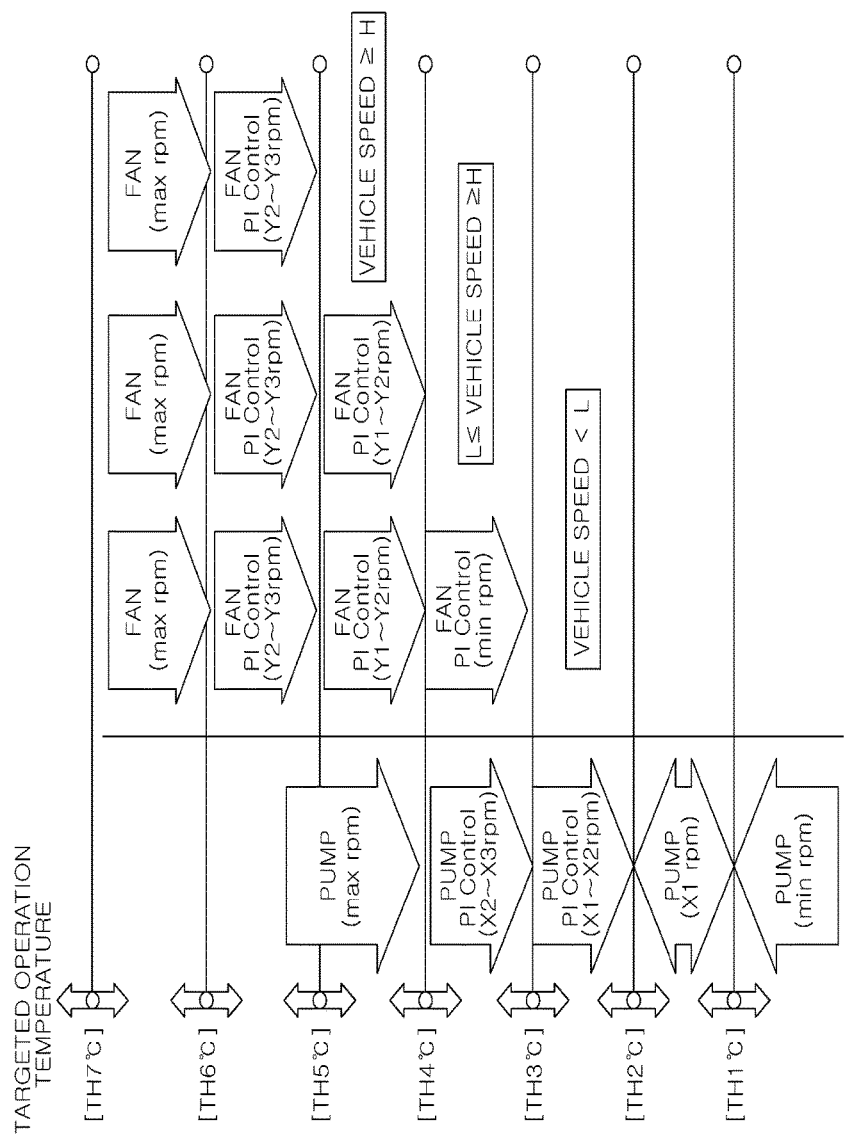
FIG. 12 is an exemplary graph illustrating a targeted operation temperature which is a reference temperature adjusting RPM of a cooling water pump, RPM of a radiator fan, or an opening of a thermostat is changed depending on a change in a high temperature range.

FIG. 1 is a graph for describing a method for controlling power of a fuel cell according to Comparative Example, FIG. 2 is a graph for describing a method for controlling power of a fuel cell according to an exemplary embodiment of the present invention, FIGS. 3 and 4 are flow charts of the method for controlling power of a fuel cell according to the exemplary embodiment of the present invention, FIG. 5 is a graph for a use result of the method for controlling power of a fuel cell according to Comparative Example, FIG. 6 is a graph for a use result of the method for controlling power of a fuel cell according to the exemplary embodiment of the present invention, FIGS. 7 and 8 are graphs for a comparison result of the method for controlling power of a fuel cell according to the exemplary embodiment of the present invention and Comparative Example, FIG. 9 is a diagram describing a cooling control associated with a power control according to the exemplary embodiment of the present invention, and FIGS. 10A and 10B are graphs illustrating current limiting reference temperature declination depending on a vehicle speed and outdoor temperature in the method for controlling power according to the exemplary embodiment of the present invention. FIG. 11 is a diagram illustrating a fuel cell system of a vehicle and FIG. 12 is a graph illustrating an example in which a targeted operation temperature which is a reference temperature adjusting RPM of a cooling water pump, RPM of a radiator fan, or an opening of a thermostat is changed depending on a change in a high temperature range.

In particular, FIG. 11 is a diagram illustrating a fuel cell system of a vehicle, in which the fuel cell system includes a hydrogen supply system, an air supply system, and a cooling system and a separate fuel cell load apparatus 500. The cooling system includes a water pump 310 configured to supply cooling water, a radiator and a radiator fan 300 for heat radiation of cooling water, and a thermostat 320 configured to measure a temperature of cooling water and configured to adjust an amount of water of a radiator loop and a bypass loop. The fuel cell load apparatus 500 may be used as an apparatus for preventing a stack voltage from increasing during warm-up of a fuel cell or starting/shut down. The fuel cell load apparatus may be a resistor, or a chargeable high voltage battery, or other load apparatuses. An air blower 100 may be configured to supply air to a stack 200 and a hydrogen valve 400 configured to supply or block hydrogen to the stack 200. The temperature of the fuel cell may be variously measured, but may be detected by measuring a temperature of cooling water for cooling the fuel cell and the power of the fuel cell may be limited by adjusting a voltage and current of the fuel cell based on an adjustment of air supply or hydrogen supply.

The Comparative Example of the related art, which may be compared with the present invention, will be first described with reference to FIG. 1. In the Comparative Example of FIG. 1, when the measured temperature of the fuel cell is equal to or less than a first temperature, the power of the fuel cell is fixed to be a first power threshold value and when the measured temperature of the fuel cell ranges from the first temperature to a second temperature, as the temperature increases, the power threshold value (e.g., power limit value) of the fuel cell may be increased between the first power threshold value and a maximum power threshold value. Further, since the measured temperature of the fuel cell ranges from the second temperature to a third temperature which is a normal section, the temperature of the fuel cell may be set to generate power corresponding to about 100% of the power threshold value of the fuel cell in that the power is not particularly limited (e.g., the power of the fuel cell is not particularly limited).

Meanwhile, when the measured temperature of the fuel cell is in a section of the third temperature and a fourth temperature (e.g., a predetermined high temperature range), as the temperature of the fuel cell is increased, the power threshold value of the fuel cell may be reduced between a current power value and a minimum power threshold value. When the temperature of the fuel cell is equal to or greater the fourth temperature, that is, exceeds the high temperature range, the temperature of the fuel cell may be detected as an ultra-high temperature and thus an operation of the fuel cell stops, that is, the power threshold value of the fuel cell my be adjusted to the minimum power threshold value (e.g., about 0%).

Furthermore, to adjust the temperature of the fuel cell, a controller may be configured to operate the radiator fan and the water pump to prevent the stack from being increasing to a predetermined high temperature and the warm-up control may be performed using the fuel cell load apparatus to prevent the stack from being a predetermined low temperature. Accordingly, even though the controller is configured to prevent the stack from reaching the high temperature or low temperature operation, the temperature may not be maintained within an appropriate range due to the limitation of cooling and warm-up performance. Consequently, like Comparative Example of FIG. 1, a method for limiting power to temperature to prevent (e.g., flooding prevention during low temperature, prevention of high temperature dry-out, prevention of high temperature deterioration, and the like) a stack from deteriorating may be considered. In particular, since a power limit map based on the temperature may used, the power limit may vary based on the varying temperature and thus drivability may be aggravated (e.g., due to shaking). Meanwhile, the first temperature may be 15 degrees Celsius, the second temperature may be 55 degrees Celsius, the third temperature may be 72 degrees Celsius, the fourth temperature may be 82 degrees Celsius, and the fifth temperature may be 77 degrees Celsius. The high temperature may be the third temperature or more, and the low temperature may be the second temperature or less.

The present invention will be described with reference to FIGS. 2 to 4. The system and method for controlling power of a fuel cell according to the exemplary embodiment of the present invention may include adjusting the power threshold value of the fuel cell based on the measured temperature of the fuel cell. In particular, the method described herein below may be executed by a controller having a processor and a memory. Additionally, the various detected temperatures may be measured using a temperature sensor.

First, when the temperature of the fuel cell is equal to or less than the first temperature, detected by measuring the temperature of the fuel cell (S10), a low temperature step (S12) which fixes (S14) the power of the fuel cell to a first power threshold value may be performed. In other words, when the measured temperature of the fuel cell is less than a low temperature range (e.g., temperature range between the first temperature and the second temperature), the power threshold value of the fuel cell may be fixed to the first power threshold value. As illustrated in FIGS. 2 to 4, the first power threshold value may be set to be greater than the minimum power threshold value in the high temperature range (e.g., temperature range between the third temperature and the fourth temperature). The low temperature range may be a temperature range between the first temperature at which the power threshold value of the fuel cell may be maintained substantially constant and then starts to increase and the second temperature at which the power threshold value is increased and then reaches the maximum power threshold value.

When temperature of the fuel cell is maintained to be equal to or greater than a reference value for a reference period of time, the first temperature may be adjusted downward (e.g. may be adjusted to be reduced or may be decreased), as shown in a graph shifted to the left of FIG. 2. In other words, the first temperature may be reduced to first temperature' and the second temperature may be reduced to second temperature'. Further, when the temperature of the fuel cell is maintained to be equal to or greater than the reference value for a reference period of time, the first power threshold value may be adjusted upward (e.g., may be adjusted to be increased). In other words, in limiting the low temperature power, the low temperature power limit may be mitigated after the warm-up of the fuel cell. Therefore, in response to determining that the fuel cell is warmed-up for a predetermined period of time after the cooling pump is driven (e.g., when temperature of the fuel cell is maintained to be equal to or greater than the reference value for the reference time), the first temperature and the first power threshold value may be changed.

Meanwhile, when the measured temperature of the fuel cell ranges from the first temperature to the second temperature (e.g., the low temperature range) (S20), a middle-low temperature step (S22) may be performed to determine the power threshold value of the fuel cell using a graph having a rising gradient between the first power threshold value and the maximum power threshold value. Further, in the middle-low temperature step, a graph which has a hysteresis H section provided after and before the first temperature and the second temperature and the rising gradient is configured of a rising graph (e.g., an increasing graph) and a falling graph (e.g., a decreasing graph) at an upper limit point and a lower limit point of the hysteresis section, respectively, thereby preventing the power threshold value of the fuel cell from being suddenly changed based on the change in the temperature of the fuel cell. Even though the measured temperature of the fuel cell is within the low temperature range, when the measured temperature is within a preset limit temperature range, the power threshold value of the fuel cell may be adjusted to be maintained substantially constant.

In other words, since the power limit map based on the temperature is used, the power limit may also be shaken (e.g., adjusted) based on the shaking (e.g., variance) of the temperature and thus the drivability may be aggravated. To minimize the shaking of the power, a hysteresis H band in the limit temperature range based on the change in temperature may be applied. For the change in temperature within the hysteresis band, the power threshold value may be maintained and thus the shaking of the power may be mitigated. By differentiating the band during the increase of temperature and the band during the decrease of temperature, the power may be directly limited during the temperature increase in the high temperature power limit region and the recovery for the power limit may be slow (e.g., reduced) during the temperature reduction.

However, in the power limit, a slew rate over time may be added and thus the shaking of the power limit over time may also be minimized. In other words, when the measured temperature of the fuel cell is within a low temperature range and is within the preset limit temperature range, the power threshold value may be increased when the power threshold value of the fuel cell is maintained substantially constant during the increase in the measured temperature of the fuel cell and then deviates from the limit temperature range and the power threshold value may be reduced when the power threshold value of the fuel cell is maintained substantially constant during the reduction in the measured temperature of the fuel cell and then deviates from the limit temperature range.

Therefore, as illustrated, in the middle-low temperature step, a graph which has the hysteresis H section, which is the limit temperature range, provided after and before the first temperature and the second temperature and the rising gradient is configured of a rising graph u and a falling graph d at the upper limit point and the lower limit point of the hysteresis section, respectively. When the temperature of the fuel cell is maintained to be equal to or greater than the reference value for the reference period of time, the fuel cell may be determined to be sufficiently warmed-up and thus the graph may be shifted to u1 and d1, and simultaneously, the first power threshold value may also be increased to the second power threshold value. Further, when the measured temperature of the fuel cell ranges from the second temperature to the third temperature (S30), a middle temperature step (S32) to adjust the power threshold value of the fuel cell to the maximum power threshold value may be performed.

Meanwhile, when the measured temperature of the fuel cell ranges from the third temperature to a fifth temperature (S40), a middle-high temperature step (S44) may be performed to determine the power threshold value (e.g., third temperature, maximum power threshold value: 100%) of the fuel cell using the graph having the falling gradient which connects two points (e.g., fifth temperature, current power value). In particular, the power threshold value of the fuel cell maintained at about 100% may be reduced to the current power value based on the temperature. Further, when the measured temperature of the fuel cell is equal to or greater than the fifth temperature, a high temperature step may be performed to determine the power threshold value of the fuel cell using a graph having the falling gradient between the current power value and a minimum power threshold value.

In other words, when the measured temperature of the fuel cell is within the high temperature range in which the power threshold value of the fuel cell is reduced based on the increase in temperature of the fuel cell, when the measured temperature of the fuel cell is increased and then is equal to or greater than a predetermined temperature, the power threshold value may be directly reduced from the power value at the predetermined temperature.

In particular, the high temperature range may be a temperature range between the third temperature at which the power threshold value starts to be reduced based on the increase in temperature of the fuel cell and the fourth temperature at which the power threshold value is reduced and then reaches the minimum power threshold value. When the measured temperature of the fuel cell is the fifth temperature which is preset to be greater than the third temperature and less than the fourth temperature, the power threshold value of the fuel cell may be reduced between the maximum power threshold value based on the increase in the measured temperature of the fuel cell and the power value of the fifth temperature. Further, when the measured temperature of the fuel cell is greater than the fifth temperature which is preset to be greater than the third temperature and less than the fourth temperature, the power threshold value of the fuel cell may be reduced between the power value at the fifth temperature and the minimum power threshold value.

Further, when the temperature of the fuel cell ranges from the fifth temperature to the fourth temperature (S50), the high temperature step may be performed to adjust the power threshold value of the fuel cell to have the falling gradient between the current power value and the minimum power threshold value (0%) and when the temperature of the fuel cell is equal to or greater than the fourth temperature, the high temperature step may be performed so to limit the power of the fuel cell to about 0% (S54). In other words, when the measured temperature of the fuel cell exceeds the high temperature range, the power threshold value of the fuel cell may be fixed to the minimum value.

Further, similar to when the temperature of the fuel cell is within the low temperature range, even though the measured temperature of the fuel cell is within the high temperature range, when the measured temperature is within the preset limit temperature range, the power threshold value of the fuel cell may be maintained to be substantially constant. In other words, when the measured temperature of the fuel cell is within the high temperature range and is within the preset limit temperature range of the high temperature range, when the power threshold value of the fuel cell is maintained substantially constant during the reduction in the measured temperature of the fuel cell and then deviates from the limit temperature range, the power threshold value may be increased and when the measured temperature of the fuel cell is increased, when the power threshold value of the fuel cell is maintained substantially constant and then deviates from the limit temperature range, the power threshold value of the fuel cell may be reduced.

Particularly, in the middle-high temperature step (S44), the actual power may be continuously sensed in real time and may thus be continuously updated (S42), and in the high temperature step, the current limit map may be determined based on the actual power finally recorded in the middle-high temperature step. Further, even in the middle-high temperature step, an equation is configured so that as the temperature is less than the fifth temperature, the power threshold value is set to be greater than the actual power. For example, in the section in which the temperature continuously increases, in the middle-high temperature step, when a difference between the power threshold value and the actual power is gradually reduced and then the temperature reaches the fifth temperature, the difference becomes about 0 and thus the power threshold value may be the actual power and when the value is stored and the high temperature step is preformed, the power threshold value may be reduced from the stored power value to about 0%.

Referring to FIG. 4, whether the temperature of the fuel cell is greater than the third temperature may be determined (S401) and in response to determining that the temperature of the fuel cell is greater than the third temperature, whether the current limit temperature is greater than the fifth temperature may be determined (S403). In response to determining that the temperature of the fuel cell is less than the third temperature, mode 1 which maximally maintains the power threshold value may be performed (S405). In response to determining that the current limit temperature is greater than the fourth temperature based on whether the current limit temperature is greater than the fifth temperature, the actual power value of the fuel cell may not be updated (S407). Further, in response to determining that the current limit temperature is less than the fifth temperature, the actual power value of the fuel cell may be updated and recorded (S409). In particular, the power threshold value may be a value between the maximum power threshold value and the actual power which is called mode 2 (S411). The power threshold value may be a minimum value in the actual power+K*(fourth temperature−current temperature) and the maximum power threshold value.

Furthermore, the actual power value of the fuel cell may not be updated (S407) and whether the current limit temperature is equal to or greater than the fourth temperature may be determined again (S413). In response to determining that the current limit temperature is equal to or greater than the fourth temperature, the power threshold value may be reduced to about 0%, which is called mode 4 (S415). In response to determining that the current limit temperature is less than the fifth temperature, the power threshold value may be a value between the actual power and about 0%. As the temperature increases, the power threshold value follows a map which is reduced from which the finally recorded current power value to 0%, which is called mode 3 (S417).

In mode 2, the actual power may be sensed continuously in real time and may be updated, while in mode 3, a current limit map may be determined based on the actual power finally recorded in the mode 2, that is, the actual power when the temperature is the fourth temperature. For example, in the section in which the temperature continuously rises, in the mode 2, when the difference between the power threshold value and the actual power is gradually reduced and then the temperature reaches the fifth temperature, the difference becomes 0 and thus the power threshold value may be the actual power and when the value is stored and the mode 3 is preformed, the power threshold value may be reduced from the stored power value to about 0%.

In the Comparative Example of FIG. 1, when power is limited, starting from 100% which is the maximum power threshold value during high temperature and thus the power is reduced to low power, the actual power limit occurring reference temperature may occur (e.g., as illustrated in FIG. 1, when the temperature reaches the third temperature at the power of about 70%, the actual power limit starts at a higher temperature than the third temperature). Therefore, according to the exemplary embodiment of the present invention, as illustrated in FIG. 2, the power may be rapidly limited from the actual power at which the high temperature is generated to maintain the consistency of the power limit occurring reference temperature, such that the actual power may be limited from the fifth temperature independent of the amount of actual power. As the result, the region in which the stack is unexpectedly operated at high temperature may be minimized.

Meanwhile, in limiting the power at high temperature, a convergence power deviation may occur during the limiting of the power at high temperature due to a difference in a maximum heat radiation amount (e.g., environmental factors such as outdoor temperature and climbing) and when the temperature is converged at the low/middle power, a humidification situation may be aggravated since generation water is insufficient due to the current of the fuel cell. Therefore, the deterioration of the fuel cell may be further accelerated, and as a result, the fuel cell may deteriorate to an irreversible situation.

In other words, the third temperature and the fourth temperature which are the reference temperature of the high temperature range may be changed based on outdoor temperature and a climbing angle (e.g., a road inclination) or an operation speed of the fuel cell for a vehicle. The third temperature or the fifth temperature may be adjusted downward (e.g. may be decreased) as the vehicle speed is reduced, the outdoor temperature increases, or the climbing angle is substantial (e.g., greater than a predetermined angle). Further, the third temperature or the fifth temperature may be adjusted downward when the measured temperature of the fuel cell is equal to or greater than the third temperature and is maintained for a predetermined period of time and as the vehicle speed is reduced, the outdoor temperature increases, or the climbing angle is substantial.

To improve the humidification situation, the high temperature power limiting reference temperature should be decreased. The maximum heat radiation performance of the fuel cell depends on the heat radiation performance of the radiator and may be changed based on the environmental factors such as the high outdoor temperature and a limit of a speed of driving wind due to the climbing except for the design factors. Among the environmental factors, the outdoor temperature and the vehicle speed may be selected based on a variable reference. In addition, other factors which affect the maximum heat radiation performance may be used. For example, as a climbing angle is increased, the reference temperature declination value may be increased.

Therefore, the third temperature and the fifth temperature may be adjusted downward (e.g., decreased) when the vehicle speed is reduced or the outdoor temperature increases. Further, even in the middle-high temperature step, the graph which has the hysteresis section provided after and before the third temperature and the fifth temperature and the falling gradient is configured of a falling graph d' and a rising graph u' at an upper limit point and a lower limit point of the hysteresis section, respectively, to prevent the power threshold value of the fuel cell from being suddenly changed based on the change in temperature of the fuel cell and moves to an u1' and d1' graph during shifting of the vehicle.

Further, even in the high temperature step, the graph which has the hysteresis section after and before the fifth temperature and the falling gradient is configured of the falling graph and the rising graph at the upper limit point and the lower limit point of the hysteresis section, respectively, thereby preventing the power threshold value of the fuel cell from being suddenly changed based on the change in temperature of the fuel cell.

FIG. 5 is a graph for a use result of the method for controlling power of a fuel cell according to the Comparative Example and FIG. 6 is a graph for a use result of the method for controlling power of a fuel cell according to the exemplary embodiment of the present invention, in which as compared with the Comparative Example, according to the exemplary embodiment of the present invention, the shaking of the stack current is substantially mitigated, such that the drivability may be improved.

FIGS. 7 and 8 are graphs for a comparison result of the method for controlling power of a fuel cell according to the exemplary embodiment of the present invention and the Comparative Example, in which the power and the vehicle speed are shown during the high temperature climbing operation and the temperature power limit is applied to the low/middle power due to the limit of the heat radiation performance (e.g., outdoor temperature is high and driving wind is minimal).

In the Comparative Example, compared with the operation in a flat land (e.g., substantially flat road with minimal road inclination) or a low temperature environment, the convergence power in the high temperature operation state of the fuel cell may be reduced and the generation water required for humidification may be insufficient, and thus the humidification situation may be further aggravated. Consequently, the same voltage as current may be reduced due to the performance degradation and the power may be reduced, and thus the maintained vehicle speed may be reduced.

In addition, to prevent the humidification situation from being aggravated, like the exemplary embodiment of the present invention when the temperature current limit is limited in advanced based on the external environment such as the vehicle speed, the outdoor temperature, and the climbing angle, the vehicle speed may be reduced due to the temporary power limit but the current/voltage characteristics of the fuel cell may be maintained over a substantial period of time, such that it may be appreciated that the final vehicle speed may be maintained to be increased. In other words, the core of the present invention is to prevent the performance degradation of the fuel cell by previously recognizing the situation that the humidification situation of the fuel cell may be aggravated.

FIGS. 10A and 10B are graphs illustrating current limiting reference temperature declination based on a vehicle speed and outdoor temperature in the method for controlling power according to the exemplary embodiment of the present invention. Referring to FIGS. 10A and 10B, the reference temperature declination for limiting power may be reduced based on the increase in the vehicle speed and may be increased based on the increase in the outdoor temperature. In other words, the power limiting reference temperature in the high temperature region may be set to be lower or higher as a size of the driving wind is changed due to the outdoor temperature, the climbing, or the vehicle speed. In addition, other factors which affect the maximum heat radiation performance of the fuel cell vehicle may be used.

According to the method for limiting power of a fuel cell of a vehicle configured as described above, it may be possible to prevent power from being suddenly changed in limiting the power of the fuel cell to prevent the deterioration and the performance degradation of the fuel cell. Further, it may be possible to make the start timing of the power limit consistent and effectively limit the power by actively responding to the change in external environment.

FIG. 9 is a diagram for describing a cooling control associated with a power control according to the exemplary embodiment of the present invention. Referring to FIG. 9, when the power limiting reference temperature is changed, a proportional-integral (PI) control reference of the cooling water pump may be changed. In other words, when the power limiting reference temperature is reduced, a cooling water target temperature of an inlet of the stack may also be set to be reduced. When the power limiting reference temperature increases, the cooling water target temperature of the inlet of the stack may be set to be increased, as described in FIG. 2.

FIG. 12 is a graph illustrating an example in which a targeted operation temperature which is a reference temperature adjusting RPM of a cooling water pump, RPM of a radiator fan, or an opening of a thermostat is changed based on a change in a high temperature range. In other words, the high temperature range may be changed based on a change in at least one of the vehicle speed, the outdoor temperature, and the climbing angle and as the high temperature range is changed, the step of the cooling control temperature may be changed. In operating the cooling water pump and the radiator fan for each temperature step, the targeted operation temperature (e.g., TH1° C. to TH7° C.) which is the reference temperature of the cooling control may also be changed. The matters associated therewith are disclosed in Korean Patent Laid-Open Publication No. KR10-2012-0053137 and therefore the detailed description of the drawings will be omitted. However, a feature of the present invention is that the cooling control is performed to change the targeted operation temperature based on the change in the temperature range for the power threshold value.

According to the method for controlling power of a fuel cell configured as described above, it may be possible to prevent power from being suddenly changed in limiting the power of the fuel cell to prevent the deterioration and the performance degradation of the fuel cell. Further, it may be possible to make the start timing of the power limit consistent and effectively limit the power by actively coping with the change in external environment.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for controlling power of a fuel cell, comprising:
   measuring, by a controller, a temperature of the fuel cell; and
   when the measured temperature of the fuel cell is within a high temperature range in which a power threshold value of the fuel cell is reduced based on an increase in temperature of the fuel cell and when the measured temperature of the fuel cell is increased and then is equal to or greater than a predetermined temperature, reducing, by the controller, the power threshold value from a power value at the predetermined temperature,
   wherein the high temperature range is a range between a third temperature at a power of about 70% of an actual power limit and at which the power threshold value is reduced based on the increase in temperature of the fuel cell and a fourth temperature at which the power threshold value is reduced and then reaches a minimum power threshold value of 0%.

2. The method of claim 1, wherein the reducing of the power threshold value further includes:
   reducing, by the controller, the power threshold value of the fuel cell between a maximum power threshold value based on the increase in the measured temperature of the fuel cell and a power value of a fifth temperature, when the measured temperature of the fuel cell ranges from the fifth temperature which is preset to be greater than the third temperature and less than the fourth temperature.

3. The method of claim 1, wherein the reducing of the power threshold value further includes:
   reducing, by the controller, the power threshold value of the fuel cell between a power value at a fifth temperature and the minimum power threshold value, when the measured temperature of the fuel cell is greater than the fifth temperature which is preset to be greater than the third temperature and less than the fourth temperature.

4. The method of claim 1, further comprising:
   fixing, by the controller, the power threshold value of the fuel cell to a minimum value when the measured temperature of the fuel cell is greater than the high temperature range.

5. The method of claim 1, further comprising:
   increasing, by the controller, the power threshold value of the fuel cell based on the increase in temperature of the fuel cell when the measured temperature of the fuel cell is within a low temperature range,
   wherein the low temperature range is a range between a first temperature at which the power threshold value of the fuel cell is maintained to be substantially constant and then starts to increase and a second temperature at which the power threshold value is increased and then reaches a maximum power threshold value.

6. The method of claim 5, further comprising:
   fixing, by the controller, the power threshold value of the fuel cell to a first output threshold value greater than the minimum output threshold value within the high temperature range when the measured temperature of the fuel cell is less than the low temperature range.

7. The method of claim 6, wherein the first output threshold value is increased when the measured temperature of the fuel cell is maintained to be equal to or greater than a reference value for a reference time.

8. The method of claim 1, further comprising:
   adjusting, by the controller, the power threshold value of the fuel cell to be maintained substantially constant when the measured temperature is within a preset limit temperature range and the measured temperature of the fuel cell is within the high temperature range.

9. The method of claim 8, wherein the adjusting includes:
   increasing, by the controller, the power threshold value when the power threshold value of the fuel cell is maintained substantially constant during a reduction in the measured temperature of the fuel cell and then deviates from the limit temperature range when the measured temperature of the fuel cell is within the high temperature range and is within the preset limit temperature range; and
   reducing, by the controller, the power threshold value of the fuel cell when the power threshold value of the fuel cell is maintained substantially constant and then deviates from the limit temperature range when the measured temperature of the fuel cell is increased.

10. The method of claim 5, further comprising:
    adjusting, by the controller, the power threshold value of the fuel cell to be maintained substantially constant when the measured temperature is within a preset limit temperature range and the measured temperature of the fuel cell is within the low temperature range.

11. The method of claim 10, wherein the adjusting includes:
increasing, by the controller, the power threshold value when the power threshold value of the fuel cell is maintained substantially constant during the increase in the measured temperature of the fuel cell and then deviates from the limit temperature range when the measured temperature of the fuel cell is within the low temperature range and is within the preset limit temperature range; and
reducing, by the controller, the power threshold value when the power threshold value of the fuel cell is maintained substantially constant and then deviates from the limit temperature range when the measured temperature of the fuel cell is reduced.

12. The method of claim 1, wherein the high temperature range is changed based on outdoor temperature and a climbing angle or an operation speed of the fuel cell for a vehicle.

13. The method of claim 12, wherein the third temperature, or a fifth temperature which is preset to be greater than the third temperature and less than the fourth temperature, is decreased when a vehicle speed is reduced, the outdoor temperature increases, or as the climbing angle increases.

14. The method of claim 12, wherein the third temperature, or a fifth temperature which is preset to be greater than the third temperature and less than the fourth temperature, is decreased when the measured temperature of the fuel cell is maintained at the third temperature or greater for a predetermined period of time and when a vehicle speed is reduced, the outdoor temperature increases, or as the climbing angle increases.

15. The method of claim 5, wherein the low temperature range is changed based on whether a fuel cell stack is warmed-up prior to being driven.

16. The method of claim 15, wherein when the time period of when the measured temperature of the fuel cell is maintained to be equal to or greater than the second temperature exceeds a predetermined time, the first temperature or the second temperature is decreased or a first power threshold value greater than the minimum power threshold value within the high temperature range is increased.

17. The method of claim 12, wherein a targeted operation temperature which is a reference temperature adjusting revolutions per minute (RPM) of a cooling water pump, RPM of a radiator fan, or an opening of a thermostat is changed based on a change in the high temperature range.

* * * * *